(12) United States Patent
Nibler

(10) Patent No.: US 6,848,568 B1
(45) Date of Patent: Feb. 1, 2005

(54) BULK MATERIAL DISTRIBUTION SYSTEM

(76) Inventor: Lawrence Gene Nibler, 15495 NE. Quarry Rd., Newberg, OR (US) 97132

(*) Notice: Subject to any disclaimer, the term of this patent is extended or adjusted under 35 U.S.C. 154(b) by 0 days.

(21) Appl. No.: 10/213,836

(22) Filed: Aug. 6, 2002

(51) Int. Cl.[7] .............................................. B65G 43/08
(52) U.S. Cl. ..................... 198/572; 198/502.2; 198/530; 198/577
(58) Field of Search .......................... 700/230; 198/349, 198/358, 571, 572, 577, 360, 502.2, 573, 751

(56) References Cited

U.S. PATENT DOCUMENTS

| | | | |
|---|---|---|---|
| 3,064,357 A | * 11/1962 | Butlers ......................... | 34/560 |
| 3,621,981 A | * 11/1971 | Nimmo et al. ........... | 198/419.2 |
| 3,731,787 A | * 5/1973 | Gregor ........................ | 198/358 |
| 3,897,868 A | * 8/1975 | Smith, Jr. .................... | 222/55 |
| 3,917,050 A | * 11/1975 | Gregor ........................ | 198/358 |
| 3,927,758 A | * 12/1975 | Gregor ........................ | 198/524 |
| 3,985,222 A | * 10/1976 | Kressly ....................... | 198/617 |
| 4,212,382 A | * 7/1980 | Williams ................... | 198/502.2 |
| 4,344,520 A | * 8/1982 | Czoch et al. ............. | 198/347.3 |
| 4,729,442 A | * 3/1988 | Sichet .......................... | 177/50 |
| 5,183,143 A | * 2/1993 | Sullivan, Jr. ................ | 198/359 |
| 6,112,903 A | * 9/2000 | Kimmel et al. ............... | 209/11 |
| 6,209,711 B1 | * 4/2001 | Koopmann et al. ...... | 198/502.2 |
| 6,273,240 B1 | * 8/2001 | Mount | |

OTHER PUBLICATIONS

Nibler, Declaration of Lawrence Gene Nimber, Sep. 4, 2002.

* cited by examiner

Primary Examiner—Khoi H. Tran
(74) Attorney, Agent, or Firm—Ipsolon LLP

(57) ABSTRACT

A method, apparatus and software product for moving bulk materials effectively through a path gate in a distribution system provides at least two independently operable conveyors aligned in series such that the end of the first conveyor is adjacent to the beginning of the second conveyor with a pass gate positioned downstream of the two conveyors. In cases where the bulk material has formed into a cohesive block, the first conveyor is operated to bring the block near the second conveyor. Then, the first conveyor is slowed or stopped while the second conveyor is operated at a higher speed than the first conveyor. This action causes the portion of the cohesive block adjacent to the second conveyor to topple or break down, thereby breaking down the cohesiveness of the block and directing a portion of this toppled bulk material forward onto the second conveyor. Then, the second conveyor urges this portion of the bulk material toward the downstream path gate. Accordingly, the broken down portion of the bulk material passes freely through the path gate. In a preferred embodiment, the height of the bulk material is sensed to determine if it has formed into a semi-solid cohesive block and the first and second conveyors and the pass gate are actuated and in communication with a computer system having software for automatically performing these steps.

31 Claims, 4 Drawing Sheets

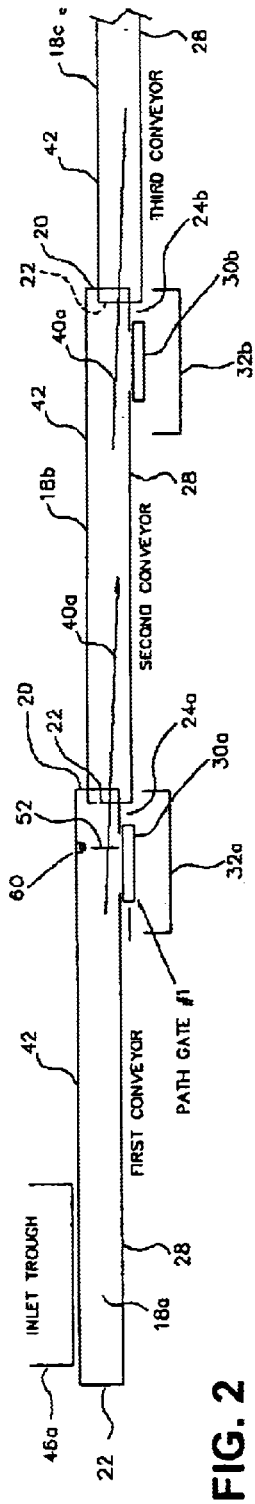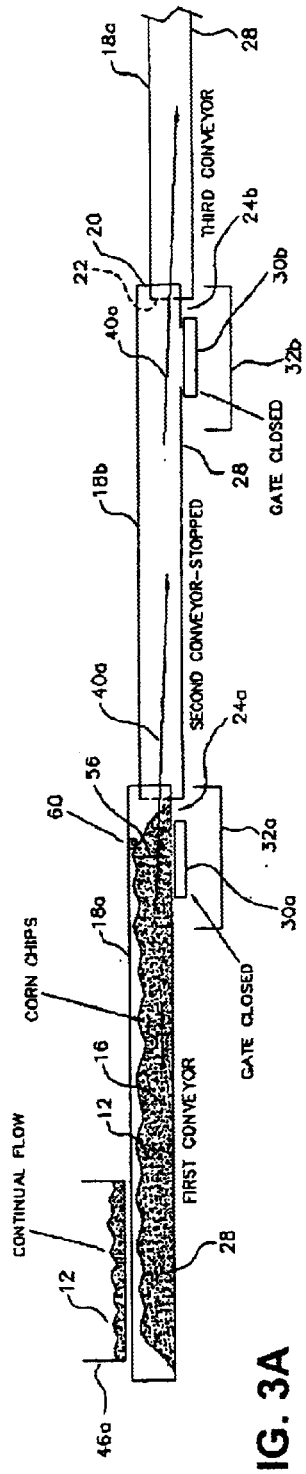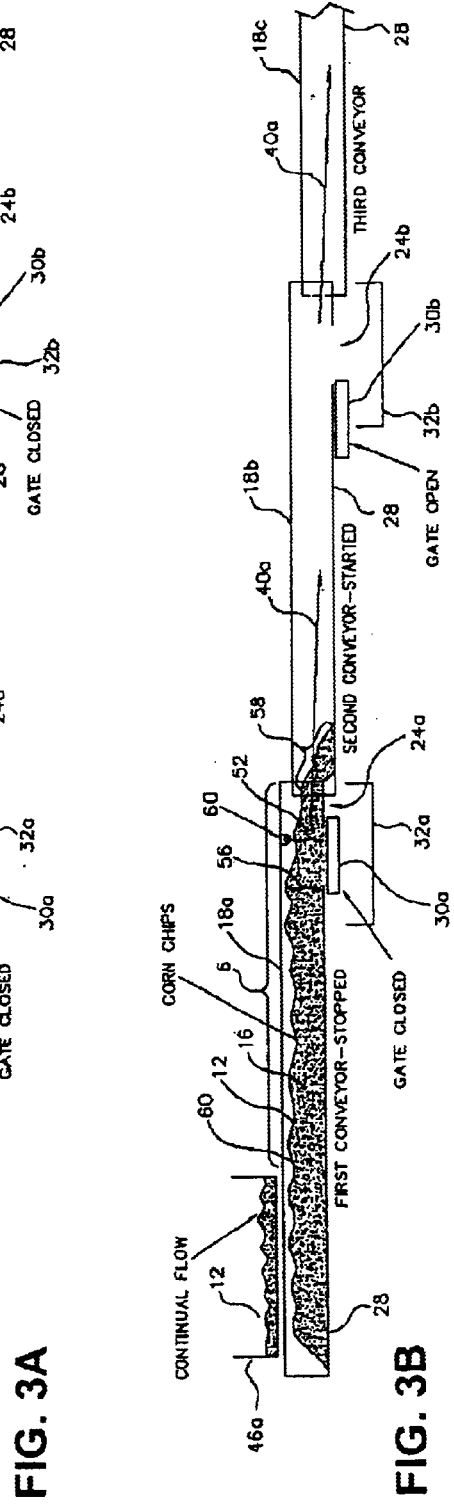

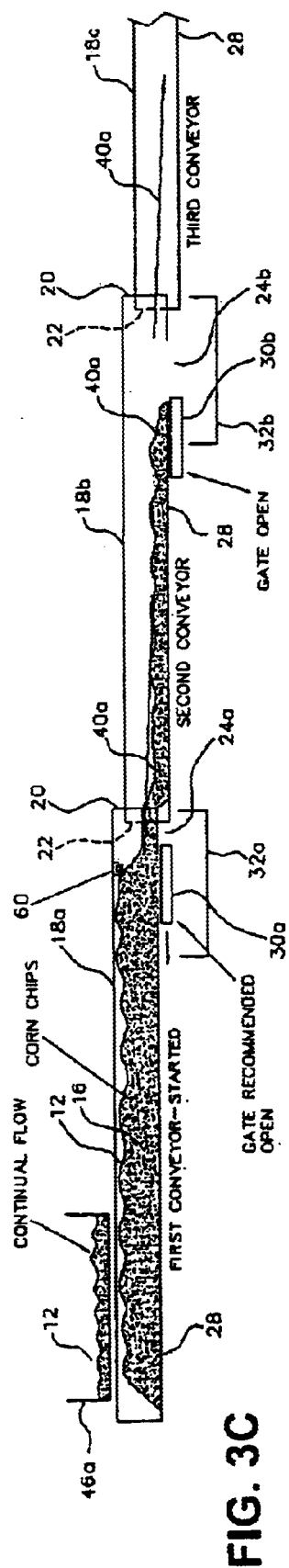
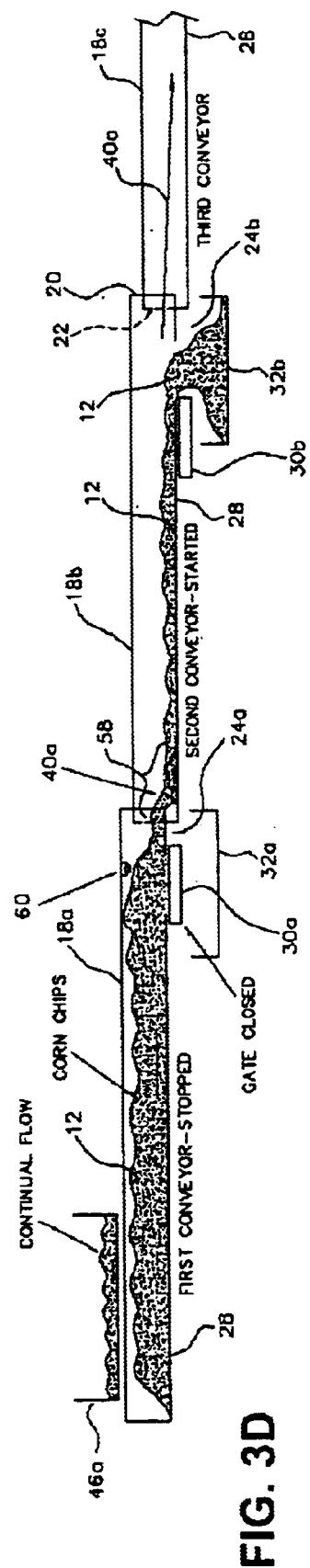

US 6,848,568 B1

BULK MATERIAL DISTRIBUTION SYSTEM

FIELD OF THE INVENTION

The present invention relates to a method, apparatus and software product for effectively moving bulk materials, such as manufactured corn chips, other processed dry food products, and the like, along a distribution system.

BACKGROUND OF THE INVENTION

The process of manufacturing and packaging bulk materials requires many steps. Usually, these steps include at least one step that must be continuously performed, and other steps that must be performed in batches. For example, in the manufacture of snack foods such as corn chips, other processed dry food products, and the like, the corn chips themselves are usually continuously produced in a first step to thereby send a continuous stream of corn chips down a distribution path. However, downstream of this first step, the corn chips are usually grouped into separate identifiable batches. For example, a portion of the stream of corn chips may be grouped together for the addition of seasoning or the like. Similarly, individual portions of the stream of corn chips are usually grouped together for packaging.

The distribution system for moving the bulk materials through such a process usually performs several functions. For example, the distribution system must quickly move the bulk materials along the various steps without damaging them or becoming plugged. The quickness of the distribution system is particularly important in the manufacture of bulk food items such as corn chips where there can be only a few minutes between manufacture and packaging or the quality of the shipped product is compromised.

In addition, the distribution system usually must also temporarily store materials and modulate their release downstream based on downstream capacity and demand. For example, a typical bagging process for corn chips includes a continuous stream of corn chips being delivered from the manufacturing step to a bagging area. Once in that area, a first conveyor operates on demand as needed by the bagging machinery. Should a bagging machine become full, inoperative or need maintenance, the volume of the corn chips on the conveyor can be increased without requiring the incoming continuous feed of manufactured corn chips to stop. The distribution system should operate effectively independent of the actual volume of the bulk materials within it.

It is desirable to have redundant components in manufacturing process and distribution systems. This redundancy increases production when all systems are operational and allows individual equipment within the process to be serviced or avoided as needed without outright stopping the entire production process.

The typical redundancy in a bulk material distribution system includes providing a plurality of paths after a process step in which the bulk material can travel through the system. For example, after corn chips are continuously manufactured in a first step, a plurality of redundant weighing and packaging machines are usually provided along separate individual paths downstream of the first step. One or more gates are usually provided along a path. Each gate usually includes an open and a closed position. In the open position, the flow of corn chips is deflected from the path to travel down a new path leading to a particular weighing and packaging machine. In the closed position, the flow of corn chips continues down the original path, thereby avoiding that particular weighing and packaging machine.

The gate should operate effectively and without damaging the bulk material. However, existing bulk material distribution systems and their gates tend to become less effective under certain circumstances. For example, under certain circumstances, the bulk material inadvertently joins together along the path to form a quasi-solid cohesive block.

It is difficult for this block to effectively pass through gates. For example, a common gate and path configuration in bulk material distribution systems includes the path being a vibratory conveyor, and the gate being an opening or slot in the bottom of a portion of the conveyor that has a sliding door that opens and closes on command. A trough is usually positioned below the slot such that if the door is open and the conveyor is on, the bulk material travels down the conveyor to fall through the slot. However, if the door is closed, the bulk material continues to travel down the conveyor. When the bulk material has formed into a quasi-solid cohesive block, the individual components tend to move with the block, and thereby "jump" the open slot, rather than fall down through it. Accordingly, a significant portion of the bulk material may not go to its commanded location in the distribution system. Usually, this misdirected bulk material is wasted.

Purely mechanical attempts to force the quasi-solid cohesive block of bulk material through an opened gate have several drawbacks. For example, using a mechanical arm or the like to push the bulk material into an opened gate requires the arm to touch a portion of the bulk material. In cases where the bulk material is fragile, such as corn chips, the arm tends to break the bulk material it contacts, thereby increasing the number of broken chips delivered to a consumer. Also, such mechanical structures are costly to build and install, particularly onto existing distribution systems, and they require the distribution system to be shut down for installation.

SUMMARY OF THE INVENTION

Accordingly, despite the benefits of existing bulk material distribution systems, there remains a need for a system that can be easily installed using existing distribution system components, that may be easily retrofit into existing distribution systems, and that provides at least two paths therethrough with a gate that operates effectively, even when the bulk material has formed into a quasi-solid block. In addition to other benefits that will become apparent in the following disclosure, the present invention fulfills these needs.

The present invention is a method, apparatus and software product for moving bulk materials effectively through a path gate in a distribution system. The invention includes using at least two independently operable conveyors aligned in series such that the end of the first conveyor is adjacent to the beginning of the second conveyor. The pass gate is positioned downstream of the two conveyors.

In cases where the bulk material has formed a cohesive block, the first conveyor is operated until a portion of the bulk material reaches a point near the second conveyor. Then, the first conveyor is slowed or stopped while the second conveyor is operated at a higher speed than the first conveyor. This action causes the portion of the cohesive block adjacent to the second conveyor to topple, thereby breaking down the cohesiveness of the block and directing a portion of this toppled bulk material forward onto the second conveyor. Then, the second conveyor urges this portion of the bulk material toward the opened path gate downstream. Accordingly, the non-cohesive bulk material then falls freely through the path gate.

In a preferred embodiment, the first and second conveyors and the pass gate are actuated and in communication with a computer system having software for automatically performing these steps. More preferably, the computer system includes at least one sensor for detecting when the bulk material has formed a cohesive block and only commands this process when such a block is detected. Even more preferably, the sensor detects the height of the bulk material on the conveyor near the pass gate, and stops the first conveyor as described whenever the detected height at the sensor is higher than a predetermined limit. As the height of the bulk material near the sensor is lowered by breaking down of the bulk material as described, the first conveyor is started again thereby moving additional bulk material toward the sensor. Should the height of this additional bulk material at the sensor be higher then the predetermined limit, the first conveyor is again slowed or stopped. Accordingly, the first conveyor essentially starts and stops repeatedly as the bulk material progresses toward the second conveyor, thereby further breaking down the semi-solid block on the first conveyor.

A plurality of conveyors and pass gates can be aligned in series to thereby form a common path having a plurality of path gates therealong with an individual path extending from each path gate. Preferably, all of the conveyors and pass gates are actuated and controlled by the computer system. The computer system includes control logic to optimize bulk material distribution within the system using this process as needed at any of the conveyors.

BRIEF DESCRIPTION OF THE DRAWINGS

FIG. 2 is an enlarged schematic side view diagram of a portion of the bulk material distribution system taken along line 2—2 of FIG. 1.

FIGS. 3A–D is an enlarged schematic side view diagram of the portion of the bulk material distribution system of FIG. 2, showing a possible sequential process for effectively commanding a cohesive block of bulk material to operably engage an open path gate in accordance with an embodiment of the present invention.

DETAILED DESCRIPTION OF A PREFERRED EMBODIMENT

A bulk material distribution system 10 that allows bulk material 12 to travel effectively through a pass gate 14 even if the bulk material has formed into a semi-solid cohesive block 16 is disclosed in FIGS. 1–4.

A. Bulk Material Distribution System

Figure 1:
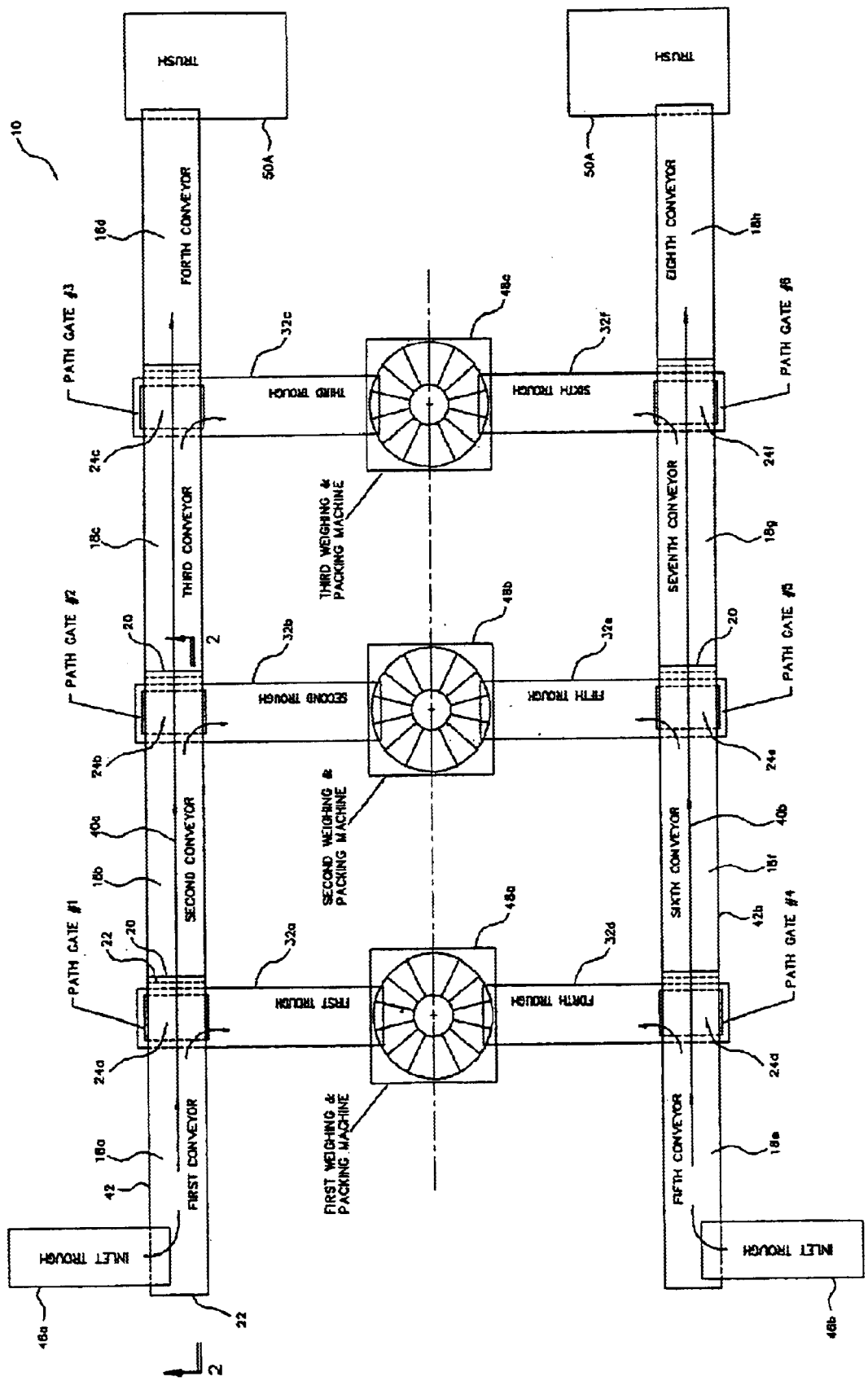
FIG. 1 is a schematic top view diagram of a portion of a bulk material distribution system in accordance with an embodiment of the present invention.

Referring to FIGS. 1–2, an exemplar bulk material distribution system 10 having a plurality of paths in which the bulk material 12 may travel is disclosed. The distribution system 10 includes a plurality of independently operable bulk material conveyors 18a–h, here first through eighth conveyors are shown and identified with element numbers 18a–h, respectively. As best shown in FIG. 2, at least two of the conveyors (18a & 18b are shown) are aligned end-to-end such that the back-end 20 of one conveyor (18a shown) feeds into the front-end 22 of a second conveyor (18b shown). This type of arrangement between the conveyors 18a–h is also known as being aligned in series.

Preferably, conveyors 18a–c and 18e–g include gates 24a–f, respectively, thereon. Each gate 24a–f has an open position (gate 24b shown in FIG. 3B) and a closed position (gate 24b shown in FIG. 3A). By way of example the operation of gate 24a is discussed below. It can be appreciated that the other gates 24c–f operate essentially in the same manner with their respective conveyors 18b–c & 18e–g. In the closed position, bulk material 12 travels from the conveyor (for example 18a in FIG. 2) having the gate 24a (FIG. 2) to the next conveyor (18b in FIG. 2) down stream of that conveyor (18b, FIG. 2). In the open position, the bulk material 12 is deflected to travel down a new path extending from that conveyor (18a, FIG. 2). For example and as best shown in FIG. 2, the conveyor 18a is preferably a conventional commercially available vibratory conveyor, and the gate 24a preferably has a slot 26a in the bottom portion 28 of that conveyor 18a. More preferably, the slot 26a is positioned toward the back-end 20 of the conveyor 18a as shown. In such case, the gate 24a also includes a sliding door 30a that covers and uncovers the slot 26a to either allow the bulk material 12 to pass to the next conveyor 18b when the door 30a is closed, or fall to a trough 32a positioned below the slot 26a when the door 30a is opened. Such conveyors 18a–h, slots 26a–f, gates 24a–f and troughs 32a–f for bulk handling of materials are well known in the art.

Preferably, the conveyors 18a–h are aligned to form one or more primary bulk material paths 40a, 40b (FIG. 1), which convey the bulk material 12 down the corresponding conveyors (18a–d for primary bulk material path 40a, and 18e–h for primary bulk material path 40b) that are aligned in parallel with each other. The plurality of gates 24a–f along each primary bulk material path 40a, 40b allow the bulk material 12 to be deflected to one or more corresponding troughs 32a–f.

The conveyors 18a–h also preferably allow for temporary storage and accumulation of bulk material 12 thereon. This is usually accomplished by increasing the volume of the bulk material on one or more of the conveyors 18a–h as more bulk material 12 must be stored. Accordingly, the conveyors 18a–h preferably include appropriate side walls 42 to allow for such storage and accumulation of bulk material 12 thereon.

FIG. 1 shows an exemplar distribution system for a bagging portion of a processed dry food, such as corn chips or the like, manufacturing process. Inlet troughs 46a, 46b deliver recently produced corn chips to the first ends of one or both of the primary bulk material paths 40a, 40b. Usually, the production of corn chips must be a continuous process. Accordingly, the corn chips are usually continuously delivered to the primary bulk material paths 40a, 40b through the inlet troughs 46a, 46b, respectively. Within the bagging portion of the corn chip manufacturing process, a plurality of bagging machines 48a–c are provided along the primary bulk material paths 40a, 40b. In particular, each bagging machine 49a–c is operably engaged with one or two troughs 32a–f extending from gates 24a–f along the primary bulk material paths 40a, 40b as shown. It can be appreciated that the conveyors 18a–h, troughs 32a–f, and gates 24a–f being oriented as shown allow corn chips delivered from the inlet troughs 46a, 46b to be directed to any of the bagging machines 48a–c within the system by commanding the appropriate sequence of conveyors 18a–h and gates 24a–f.

Usually, the primary bulk material paths 40a, 40b lead to a trash receptacle 50a, 50b, restively, if the bulk material 12 is not otherwise deflected along the primary bulk material paths 40a, 40b though an open path gate 24a–f. Accordingly, if all of the bagging machines 48a–c is occupied or otherwise unavailable and the storage and accumulation capacity of the conveyors 18a–h is at risk of being exceeded, bulk material 12 may still flow through the system without requiring the stopping of upstream processes, such as corn chip manufacturing. Of course, it is undesirable, but sometimes necessary, to send bulk material 12 to the trash receptacles 50a, 50b.

Preferably, the conveyors 18a–h and gates 24a–f are in communication with a computer system (not shown) that modulates and controls them based on several factors including sensed demand, quantity of product at a location, time bulk material has been waiting to be packaged, equipment readiness to accept additional bulk materials, and the like. It can be appreciated that such computer systems commonly include a processing unit (CPU) in conjunction with a memory system (with volatile and/or non-volatile memory), at least one input device, and at least one output device, as is known in the art.

B. Process for Allowing Bulk Material to Flow Effectively Through a Pass Gate

The height of the bulk material 12 in a conveyor 18a–h is proportional to the likelihood that the bulk material 12 will form a quasi-solid block 16 and therefore usually have difficulty passing effectively through a pass gate 24a–f in the distribution system. Moreover, for a given bulk material and conveyor size, a predetermined height 52 (FIG. 3A) of the bulk material 12 can be determined whereby bulk material 12 below that predetermined height 52 will typically pass effectively through an open gate 24a–f, and bulk material above that predetermined height 52 has a greater likelihood of forming a quasi-solid block 16.

Accordingly, the process of the present invention detects when the bulk material 12 at a location along the conveyor has a greater likelihood of forming a quasi-solid block, and modulates the corresponding conveyors when such a quasi-solid block 16 is detected. This is accomplished by adding a quasi-solid block detector 60, which is preferably a height sensor in communication with the computer system, near the transition between the two upstream conveyors 18a, 18b.

Referring to FIG. 3A, the bulk material 12 is shown in conveyor 18a, which is operating to move the bulk material 12 toward the second conveyor 18b. The volume of bulk material 12 in the conveyor can be increased by increasing the height of the bulk material on the conveyor. Accordingly, it can be appreciated that the conveyor 18a can be used to accumulate bulk material 12 as needed. The bulk material has detected height 56 at the sensor 60 greater than the predetermined height 52 thereby indicating the bulk material 12 therein has formed into a quasi-solid block 16. Gates 24a and 24b are closed and conveyor 18b is stopped.

As shown in FIG. 3B, after a quasi-solid block 16 has been indicated and there is a demand to open gate 24b to send the bulk material to trough 32b, gate 24b is opened, and conveyor 18b is started. However, conveyor 18a is stopped, thereby sending a portion 62 of the bulk material adjacent to the second conveyor 18b onto the second conveyor and breaking down or reducing the height of the bulk material at the sensor to a detected height 56 below the predetermined height 52. The portion 62 of the bulk material is further dissipated by the movement of the second conveyor 18b, thereby driving the portion 62 of bulk material toward the open flow gate 24b.

As shown in FIG. 3C, after the detected height of the bulk material is drops below the predetermined height sensed by the sensor, the first conveyor is then started, thereby driving the bulk material in the first conveyor toward the second conveyor. The second conveyor remains operating driving bulk material in the second conveyor toward the open flow gate 24b.

As shown in FIG. 3D, if the detected height of the bulk material at the sensor rises above the predetermined height, the first conveyor is again stopped, thereby again sending a portion 62 of the bulk material adjacent to the second conveyor 18b onto the second conveyor and breaking down or reducing the height of the bulk material at the sensor to a detected height 56 below the predetermined height 52. The second conveyor remains operating to drive bulk material in the second conveyor toward the open flow gate 24b. It can be appreciated that steps shown in FIGS. 3C and 3D can be repeated continuously, essentially repeatedly starting and stopping the first conveyor based on the detected height of the bulk material at the sensor. Accordingly, this repeated started and stopping further contributes to breaking down the height of the bulk material in the conveyor, further preventing the bulk material from inadvertently jumping the opened path gate 24b.

Figure 4:
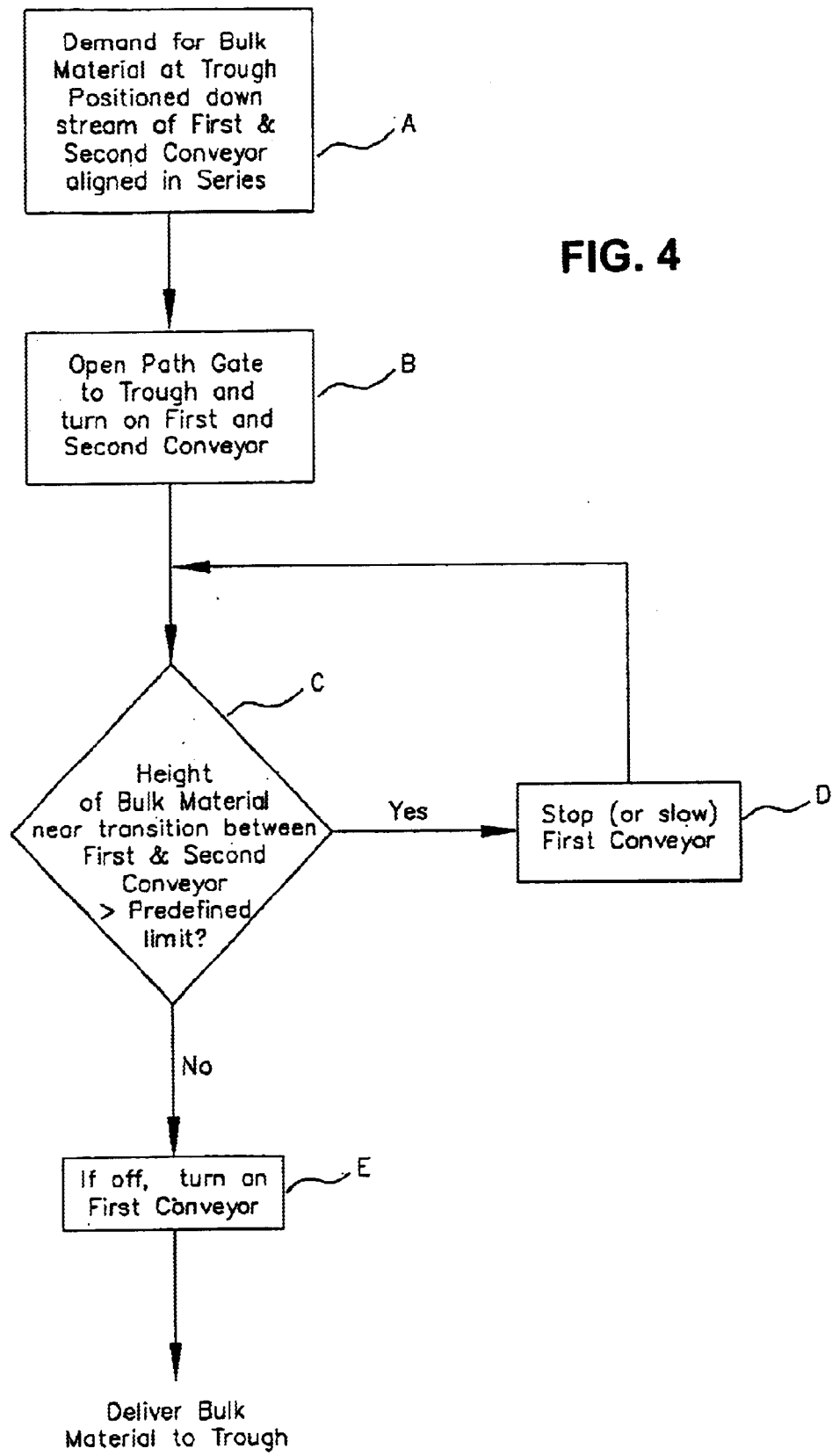
FIG. 4 is a block diagram of a process for commanding bulk material to operably engage a path gate in a bulk material distribution system.

Referring to FIG. 4, this process can also be described in a flow chart, which can readily be coded into an existing computer system software program. In Step A, the computer system uses existing command and detection logic to determine that bulk material needs to be sent to a trough positioned downstream of a plurality of independently operable conveyors aligned in series such that a first conveyor feeds bulk material into a second conveyor. Preferably, the computer system then opens the pass gate adjacent to the downstream trough and turns on the plurality of conveyors leading to that trough (Step B).

Then, the computer system then determines if the height of the bulk material at a location near the transition between the first upstream conveyor and the second upstream conveyor is higher than the predetermined amount. (Step C).

If this height of the bulk material is greater than or equal to the predetermined limit determined in Step C, the first upstream conveyor is stopped or slowed (Step D) while the second downstream conveyor remains operating. This causes a portion of the bulk material in the first conveyor and adjacent to the second conveyor to topple toward and onto the second conveyor. The first conveyor remains stopped or slowed until the detected height of the conveyor drops below the predetermined limit.

If the detected height of the bulk material drops below the predetermined limit in Step C, the first conveyor is restarted or its speed is increased to the speed of the second conveyor. The first conveyor remains operating so long as the demand for product downstream continues and the detected height at the transition between the first and second conveyors remains below the predetermined limit.

As shown in FIG. 1, the principles of this process can be applied equally well to any combination of two adjacent conveyors 18a&b, 18b&c, 18c&d, 18e&f, 18f&g, 18g&h, and corresponding pass gate 24a–f, respectively, in the distribution system. In cases where bulk material is directed to pass though open pass gates 24a and 24d, the respective upstream inlet troughs 46a, 46b must start and stop inlet flow to the respective first and fifth conveyors 18a, 18e in response to the sensed height of the bulk material as previously described with the upstream conveyor 18a. Preferably, all of the conveyors 18a–h, pass gates 24a–f, and inlet troughs 46a, 46b are actuated and controlled by the computer system.

More preferably and as best shown in FIG. 1, where a plurality of path gates 24a–c are aligned along a primary bulk material path 40a, the process includes automatically opening the last path gate designated for a particular production run (here path gate 24c) unless there is a specific command that requires closing it. This prevents bulk material from inadvertently passing by the last flow gate which usually results in wasting the bulk material by delivering it to a trash receptacle 50a.

Even more preferably, the process includes specific control logic that once a pass gate 24a–f is commanded open, it stays open unless there is a demand for product downstream of that pass gate 24a–f.

In accordance with the practices of persons skilled in the art of computer programming, the present invention is described above with reference to acts and symbolic representations of operations that are performed by various computer systems. Such acts and operations are sometimes referred to as being computer-executed and may be associated with the operating system or the application program as appropriate. It will be appreciated that the acts and symbolically represented operations include the manipulation by a CPU of electrical signals representing data bits, which causes a resulting transformation or reduction of the electrical signal representation, and the maintenance of data bits at memory locations in a memory system to thereby reconfigure or otherwise alter the computer system operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus. Various types of general purpose or specialized computer apparatus may be used with or perform operations in accordance with the teachings described herein. Elements of the illustrated embodiment shown in software may be implemented in hardware and vice versa. Accordingly, the claimed invention includes all such modifications as may come within the scope of the following claims and equivalents thereto.

I claim:

1. A method for moving bulk material through a bulk material distribution system, the system having an independently-operable first conveyor up-stream, in series with, and adjacent to an independently-operable second conveyor, said method comprising the steps of:
   operating the first conveyor to deliver bulk material therein toward the second conveyor;
   detecting if the bulk material within the first conveyor has formed into a semi-solid cohesive block of material using a height sensor;
   reducing the speed of the first conveyor when the bulk material is substantially adjacent to the second conveyor and operating the second conveyor at a speed greater than the reduced speed of the first conveyor when a semi-solid cohesive block of material has been detected; and,
   operating the first conveyor at a speed substantially the same as the speed of the second conveyor when a semi-solid cohesive block of material ceases to be detected.

2. The method for moving bulk material through a bulk material distribution system of claim 1, wherein said detecting if the bulk material within the first conveyor has formed into a semi-solid cohesive block of material step includes using the height sensor to determine if the height of the bulk material at the sensor is above a predetermined height.

3. The method for moving bulk material through a bulk material distribution system of claim 1, wherein said reducing the speed of the first conveyor step includes stopping the first conveyor.

4. A method for moving bulk material through a bulk material distribution system, the system having an independently-operable first conveyor up-stream, in series with, and adjacent to an independently-operable second conveyor, said method comprising the steps of:
   operating the first conveyor to deliver bulk material therein toward the second conveyor;
   detecting if the bulk material within the first conveyor has formed into a semi-solid cohesive block of material;
   reducing the speed of the first conveyor when the bulk material is substantially adjacent to the second conveyor and operating the second conveyor at a speed greater than the reduced speed of the first conveyor when a semi-solid cohesive block of material has been detected;
   operating the first conveyor at a spend substantially the same as the speed of the second conveyor when a semi-solid cohesive block of material ceases to be detected; and,
   opening a gate positioned downstream of said first and second conveyors and reducing the speed of the first conveyor step arising only after said opening a gate step.

5. A method for moving bulk material through a bulk material distribution system, the system having an independently-operable first conveyor up-stream, in series with, and adjacent to an independently-operable second conveyor, said method comprising the steps of:
   operating the first conveyor to deliver bulk material therein toward the second conveyor;
   detecting if the bulk material within the first conveyor has formed into a semi-solid cohesive block of material;
   reducing the speed of the first conveyor when the bulk material is substantially adjacent to the second conveyor and operating the second conveyor at a speed greater than the reduced speed of the first conveyor when a semi-solid cohesive block of material has been detected; and,
   operating the first conveyor at a speed substantially the same as the speed of the second conveyor when a semi-solid cohesive block of material ceases to be detected; and,
   deflecting bulk material from a primary bulk material path to a secondary bulk material path at a gate positioned downstream of the first and second conveyors.

6. The method for moving bulk material through a bulk material distribution system of claim 1, wherein said bulk material is a processed dry food product.

7. The method for moving bulk material through a bulk material distribution system of claim 6, wherein said processed dry food product is corn chips.

8. The method for moving bulk material through a bulk material distribution system of claim 1, further including the steps of:
   accumulating bulk material in the first conveyor by increasing the height of the bulk material within the conveyor; and, transferring bulk material to the second conveyor wherein the height of the bulk material in the second conveyor is lower than the height of the bulk material in the first conveyor thereby metering the amount of bulk material delivered downstream by the second conveyor while still allowing bulk material to accumulate in the first conveyor.

9. The method for moving bulk material through a bulk material distribution system of claim 1, wherein said first and second conveyors are controlled by and in communication with a computer system.

10. The method for moving bulk material through a bulk material distribution system of claim 9, wherein said detecting of the bulk material within the first conveyor has formed into a semi-solid cohesive block of material step includes using a height sensor in communication with the computer system.

11. A method for moving bulk material through a bulk material distribution system of claim 1, wherein said steps are performed by a computer readable medium that commands a computer system operably secured to the first and second conveyors to perform the steps of claim 1.

12. A bulk material distribution system for moving bulk material through a bulk material distribution path, said bulk material distribution system comprising:
   a computer system;
   an independently operable first conveyor in communication with said computer system;
   an independently operable second conveyor downstream from and adjacent to the first conveyor, said second conveyor in communication with said computer system, said first and second conveyors defining a portion of a primary distribution path for the bulk material;
   a path gate downstream of said second conveyor, said gate in communication with said computer system and having an open position wherein said bulk material is deflected from the primary distribution path to a second path and a closed position wherein said bulk material is not deflected from said primary distribution path; and,
   a sensor in communication with said computer system for detecting whether the bulk material has formed into a semi-solid cohesive block;
   wherein said computer system includes control logic for controlling the sequence in which the first and second conveyors operate based on input from the sensor, said control logic stopping the first conveyor when a semi-solid cohesive block is detected and starting the second conveyor until a semi-solid cohesive block is not detected, and said control logic starting the first conveyor when the semi-solid cohesive block fails to be detected.

13. The bulk material distribution system for moving bulk material through a bulk material distribution path of claim 12, wherein said control logic stops said first conveyor in response to the detecting of said semi-solid cohesive block when said path gate is in said open position.

14. The bulk material distribution system for moving bulk material through a bulk material distribution path of claim 12, further including:
   an independently operable third conveyor downstream of said second conveyor, said third conveyor in communication with said computer system; and,
   a second pass gate downstream of said third conveyor.

15. The bulk material distribution system for moving bulk material through a bulk material distribution path of claim 14, wherein said second pass gate is biased to a neutral open position.

16. The bulk material distribution system for moving bulk material through a bulk material distribution path of claim 15, wherein said second pass gate is closed when bulk material is demanded downstream of said second pass gate.

17. The bulk material distribution system for moving bulk material through a bulk material distribution path of claim 12, wherein said control logic includes starting and stopping said first conveyor repeatedly while maintaining the second conveyor at a constant speed.

18. The bulk material distribution system for moving bulk material through a bulk material distribution path of claim 12, wherein said bulk material is a processed dry food product.

19. The bulk material distribution system for moving bulk material through a bulk material distribution path of claim 12, wherein said first and second conveyors are vibratory conveyors.

20. The bulk material distribution system for moving bulk material through a bulk material distribution path of claim 12, wherein said path gate is remain open once commanded unless there is a demand to move bulk material down stream of the path gate.

21. A computer readable medium for controlling a bulk material distribution system, the system controllable by a computer system and having the computer readable medium therein, an independently-operable first conveyor up-stream, in series with, and adjacent to an independently-operable second conveyor, and a height sensor for detecting the height of the bulk material, said computer readable medium including commands for:
   operating the first conveyor to deliver bulk material therein toward the second conveyor;
   detecting trough the height sensor if the bulk material is above a predetermined height;
   reducing the speed of the first conveyor when the bulk material is substantially adjacent to the second conveyor and operating the second conveyor at a speed greater than the reduced speed of the first conveyor when said bulk material at said height sensor is above the predetermined height; and,
   operating the first conveyor at a speed substantially the same as the speed of the second conveyor when said bulk material at said height sensor is at or below the predetermined height;
   wherein the difference in speeds between the first and second conveyors breaks down the height of the bulk material at a transition between said first and second conveyors.

22. The computer readable medium for controlling a bulk material distribution system of claim 21, wherein said reducing the speed of the first conveyor step includes stopping the first conveyor.

23. The computer readable medium for controlling a bulk material distribution system of claim 21, wherein said bulk material is fragile and a processed food product.

24. The computer readable medium for controlling a bulk material distribution system of claim 23, wherein said processed food product is a processed dry food product.

25. A computer readable medium for controlling a bulk material distribution system, the system controllable by a computer system and having the computer readable medium therein, an independently-operable first vibratory conveyor up-stream, in series with, and adjacent to an independently-operable second vibratory conveyor, and a height sensor for detecting the height of the bulk material, said computer readable medium including commands for:

operating the first vibratory conveyer to deliver bulk material therein toward the second vibratory conveyor;

detecting trough the height sensor if the bulk material is above a predetermined height;

reducing the speed of the first vibratory conveyor when the bulk material is substantially adjacent to the second vibratory conveyor and operating the second vibratory conveyor at a speed greater than the reduced speed of the first vibratory conveyor when said bulk material at said height sensor is above the predetermined height; and operating the first vibratory conveyor at a speed substantially the same as the speed of the second vibratory conveyor when said bulk material at said height sensor is at or below the predetermined height;

wherein the difference in speeds between the first and second conveyors breaks down the height of the bulk material at a transition between said first and second conveyors.

26. The computer readable medium for controlling a bulk material distribution system of claim 21, further including commands for:

accumulating bulk material in the first conveyor by increasing the height of the bulk material within the conveyor; and, transferring bulk material to the second conveyor wherein the height of the bulk material in the second conveyor is lower than the height of the bulk material in the first conveyor thereby metering the amount of bulk material delivered downstream by the second conveyor while still allowing bulk material to accumulate in the first conveyor.

27. A method for moving bulk material through a bulk material distribution system, the system having an independently-operable first conveyor up-stream, in series with, and adjacent to an independently-operable second conveyor, said method comprising the steps of:

accumulating bulk material in the first conveyor by increasing the height of the bulk material within the conveyor;

delivering the bulk material in the first conveyor to the second conveyor by intermittently operating the first conveyor to advance said bulk material toward said second conveyor, said intermittent operation causing the bulk material adjacent to the second conveyor to topple toward the second conveyor;

operating said second conveyor at a substantially constant speed thereby moving bulk material received from said second conveyor downstream, said bulk material in said second conveyor having a height less than the height of said bulk material in said first conveyor.

28. The method for moving bulk material through a bulk material distribution system of claim 27, further including the step of:

detecting the height of the bulk material in said first conveyor, and wherein said delivering the bulk material in the first conveyor to the second conveyor by intermittently operating the first conveyor step is performed only if the detected height of the bulk material in said first conveyor is above a predefined limit.

29. The method for moving bulk material through a bulk material distribution system of claim 27, further including a height sensor for detecting the height of said bulk material in said first conveyor, and wherein said first and second conveyors and said height sensor are controlled by and in communication with a computer system.

30. A method for moving bulk material through a bulk material distribution system, the system having an independently-operable first conveyor up-stream in series with, and adjacent to an independently-operable second conveyor, said method comprising the steps of:

accumulating bulk material in the first conveyor by increasing the height of the bulk material within the conveyor;

delivering the bulk material in the first conveyor to the second conveyor by intermittently operating the first conveyor to advance said bulk material toward said second conveyor, said intermittently operation causing the bulk material adjacent to the second conveyor to topple toward the second conveyor;

operating said second conveyor at a substantially constant speed thereby moving bulk material received from said second conveyor downstream, said bulk material in said second conveyor having a height less than the height of said bulk material on said first conveyor; and opening a gate positioned downstream of said first and second conveyors, thereby allowing bulk material from said second conveyor to flow freely through said open gate.

31. The method for moving bulk material through a bulk material distribution system of claim 30, wherein said gate is closed only if bulk material is desired downstream of the gate.

\* \* \* \* \*